Nov. 25, 1952  D. F. PRZYBYLSKI  2,618,981
VARIABLE-SPEED REDUCTION UNIT
Filed Aug. 23, 1950  5 Sheets-Sheet 1

INVENTOR.
DANIEL F. PRZYBYLSKI
BY
*Harry D. Kilgore*
ATTORNEY

Nov. 25, 1952  D. F. PRZYBYLSKI  2,618,981
VARIABLE-SPEED REDUCTION UNIT
Filed Aug. 23, 1950  5 Sheets-Sheet 2

INVENTOR.
DANIEL F. PRZYBYLSKI
BY
Harry W. Kilgore
ATTORNEY

Nov. 25, 1952     D. F. PRZYBYLSKI     2,618,981
VARIABLE-SPEED REDUCTION UNIT

Filed Aug. 23, 1950     5 Sheets-Sheet 3

INVENTOR.
DANIEL F. PRZYBYLSKI
BY
*Harry W. Kilgore*
ATTORNEY

Nov. 25, 1952  D. F. PRZYBYLSKI  2,618,981
VARIABLE-SPEED REDUCTION UNIT
Filed Aug. 23, 1950  5 Sheets-Sheet 4

INVENTOR.
DANIEL F. PRZYBYLSKI
BY Harry D. Kilgore
ATTORNEY

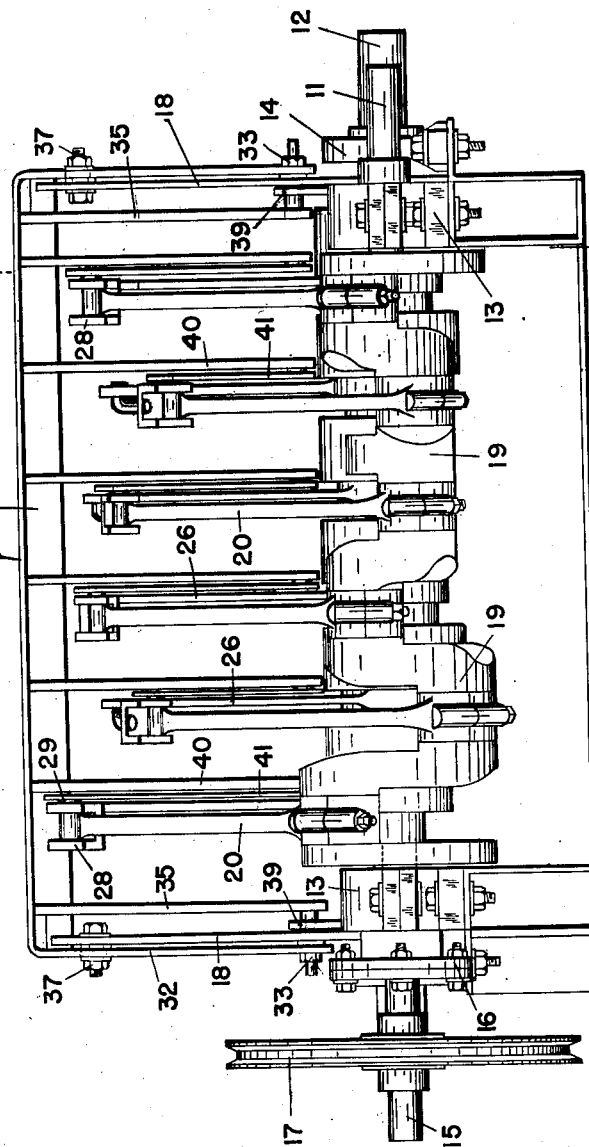

Patented Nov. 25, 1952

2,618,981

UNITED STATES PATENT OFFICE 2,618,981

VARIABLE-SPEED REDUCTION UNIT

Daniel F. Przybylski, Winona, Minn.

Application August 23, 1950, Serial No. 180,977

4 Claims. (Cl. 74—119)

My present invention relates to improvements in variable speed transmission mechanism or variable speed reduction units.

The principal objective of this invention is to provide an extremely simple and highly efficient variable speed reduction unit so designed as to make instantaneously available a wide range of infinite variable speeds ranging in ratio from any given input speed from zero up and any output speed from zero up to but not exceeding the input speed.

A further object of this invention is to provide such a speed reduction unit that has relatively few parts in series and in which the parts of each series are directly pivotally connected without relative bodily movements so that there is no slippage or lost motion.

To the above end, generally stated, the invention consists of the novel devices and combination of devices hereinafter described and defined in the claims.

In the accompanying drawings, which illustrate the invention, like characters indicate like parts throughout the several views.

Referring to the drawings.

Figure 1:
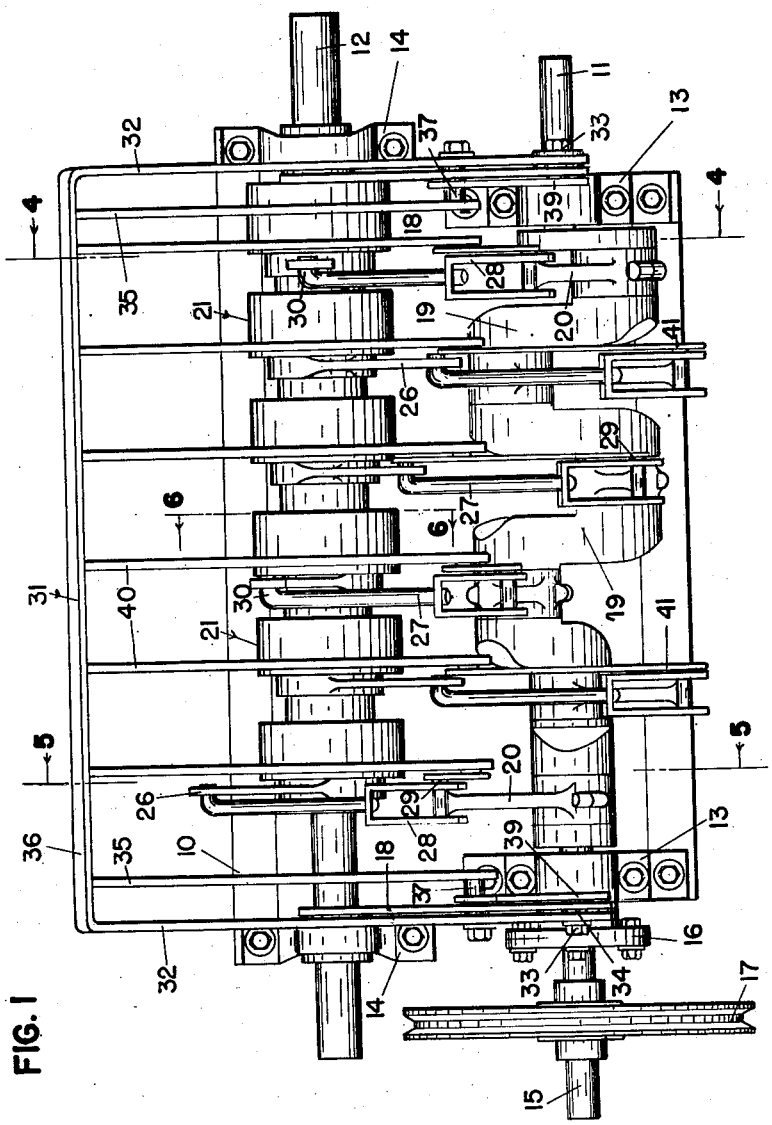
Fig. 1 is a plan view of the improved variable speed reduction unit adjusted to drive an output shaft from an input shaft at its highest speed.
Figure 2:
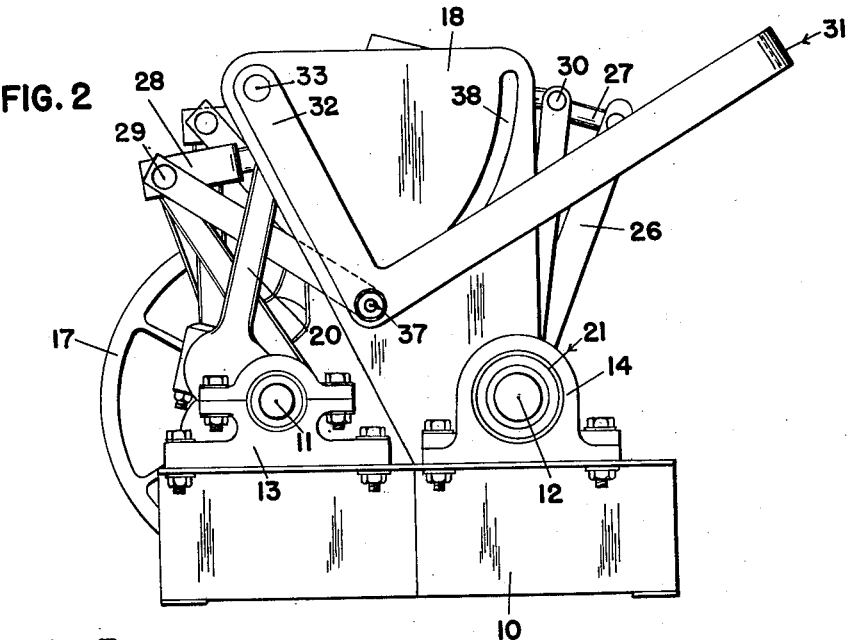
Figs. 2 and 3 are end elevational views of the same.
Figure 3:
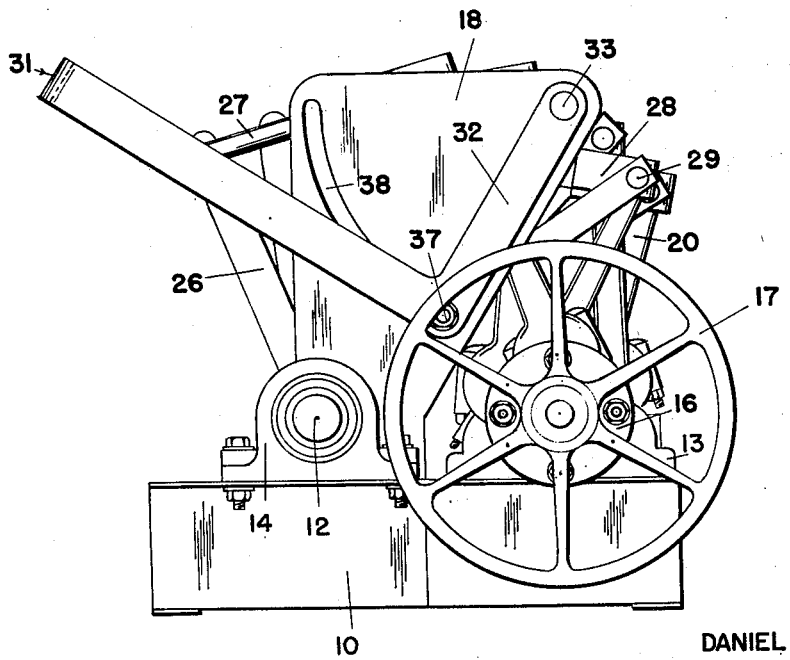
Figure 4:
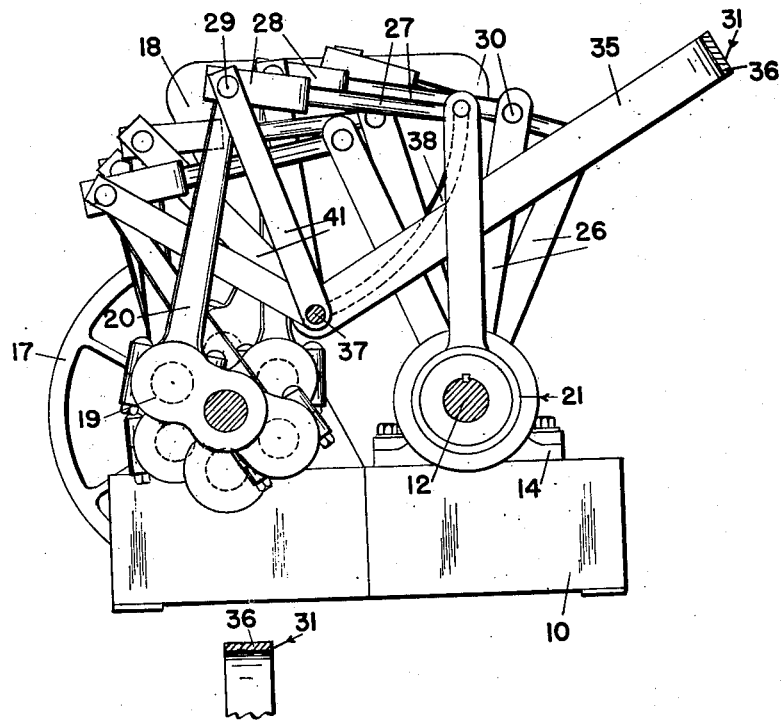
Figure 9:
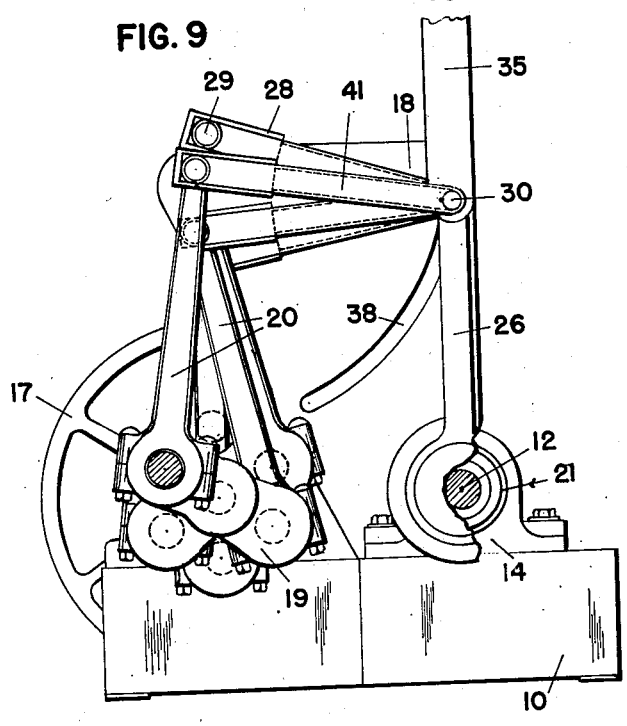
Figure 5:
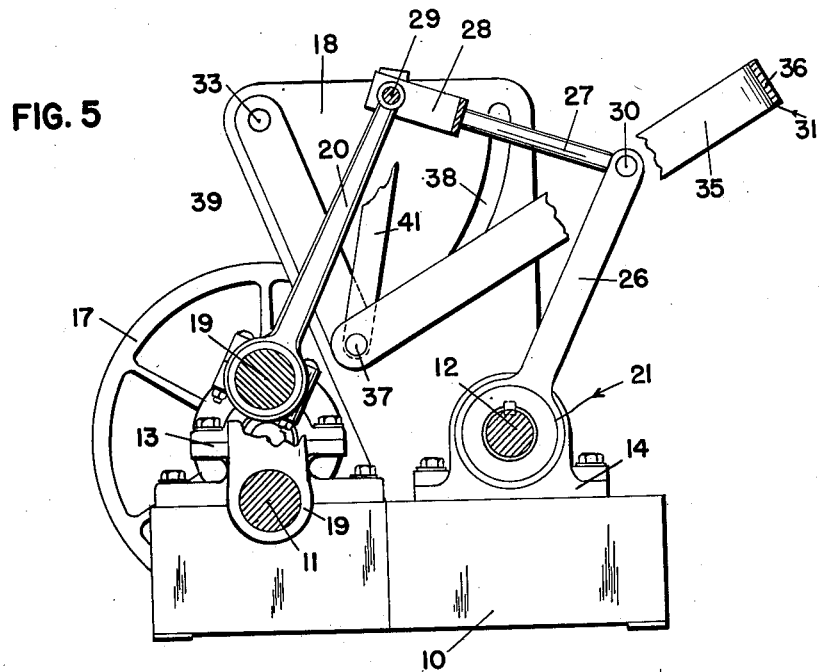
Figure 7:
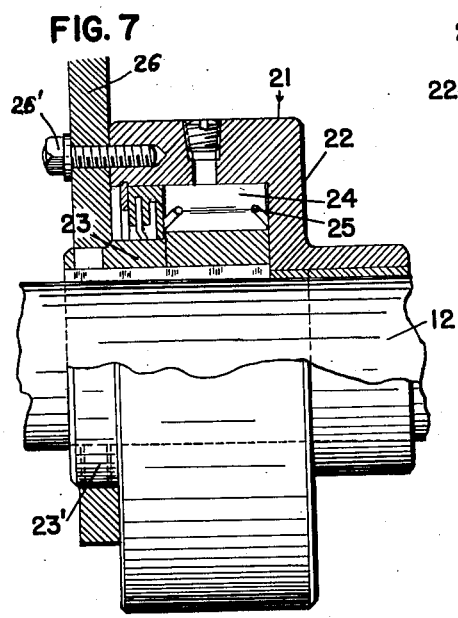
Figure 6:
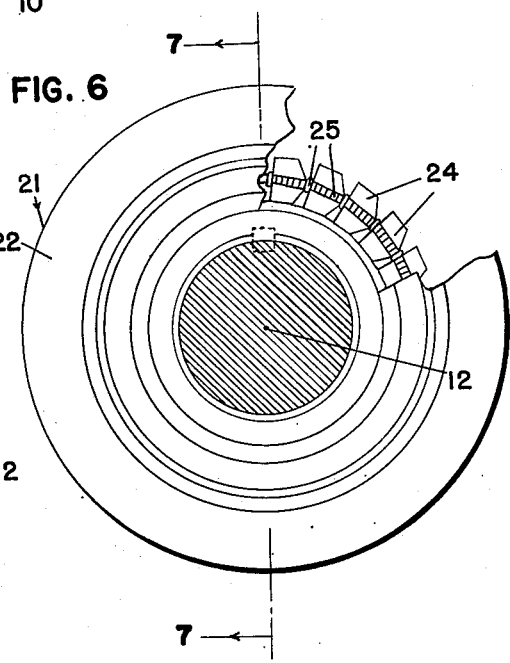

Figs. 4 and 5 are views partly in elevation and partly in section taken on the lines 4—4 and 5—5 of Fig. 1, respectively;

Fig. 6 is a detail view partly in elevation and partly in section taken on the line 6—6 of Fig. 1, on an enlarged scale;

Fig. 7 is a detail view partly in elevation and partly in section taken on the line 7—7 of Fig. 6;

Fig. 8 is a front elevational view of the improved unit adjusted with the output shaft stopped; and Fig. 9 is a view partly in elevation and partly in section taken on the line 9—9 of Fig. 8.

The numeral 10 indicates a base on which the improved variable speed reduction unit is mounted and the numerals 11 and 12 indicate, respectively, an input shaft and an output shaft. These shafts 11 and 12 extend longitudinally over the base in parallel arrangement and in the same horizontal plane. The shafts 11 and 12 are journaled, at their end portions, in bearings 13 and 14, respectively, on the base 10. The input shaft 11 has on its left-hand end an extension 15 secured thereto by a coupling 16. A large V pulley 17 on the input shaft extension 15 is driven from any suitable source of power, not shown.

A pair of end frame members 18, in the form base 10 in parallel upright positions. The input shaft 11 is provided with six cranks 19, spaced equi-distances apart about the axis of said shaft. Each crank 19 is provided with an upright connecting rod 20.

Mounted on the output shaft 12 opposite each crank 19 is a conventional clutch 21 of the "overrunning" type. Of the parts of each clutch 21 shown, it is important to note the cylindrical outer housing 22, the circular inner race 23 keyed to the output shaft 12, the sprags 24 and the energizing spring 25. This spring 25 maintains the sprags 24 in contact with both the outer housing 22 and the inner race 23.

A rocker arm 26 is mounted on the projecting end portion 23' of the race 23 for relative turning movement and is rigidly secured by a screw 26' to the outer housing 22 of each clutch 21 in an upright position. Opposite connecting rods 20 and rocker arms 26 are connected, in substantially parallel arrangement by a link 27 in the form of a round rod having on one end a yoke 28. This yoke 28 straddles the upper end portion of the respective connecting rod 20 and is pivoted thereto by a wrist pin 29. The link 27, at its other end portion, is bent laterally to afford a pin 30 on which the opposite rocker arm 26 at its upper end portion is pivoted.

The connecting rods 20 are controlled to position the same so that they simply move up and down and do not impart any movement to the rocker arms 26 and hence the output shaft 12 is stopped; or the connecting rods 20 may be positioned to operate the rocker arms 26 and drive the output shaft 12 at any desired speed from zero up to the speed of the input shaft 11.

As one means for controlling the connecting rods 20, I provide a manually operated rack 31 that includes a yoke-like member, the arms 32 of which extend along the outer sides of the end frame members 18 with a working clearance therebetween. The arms 32 are in the form of bell-cranks pivoted at their outer end portions to the end frame members 18 by means of nut-equipped bolts 33. Spacing washers 34 on the bolts 33 are interposed between the end frame members 18 and the arms 32.

The rack 31 further includes on the inner side of each end frame members 18 a bar 35 rigidly secured at one of its ends to the transverse member 36 of said rack. The bars 35, at their other or inner ends, and the arms 32, at their elbows, are connected and held parallel by nut-equipped studs 37 that extend through slots 38 in the end frame members 18. These slots 38 are on the arcs of circles having their centers at the axes of the pivot bolts 33. The bars 35 at their inner ends are supported and guided by a pair of links 39 pivoted on the bolts 33 and the studs 37.

The rack 31 still further includes a plurality of flat upright plates, is rigidly secured to the of laterally spaced bars 40 parallel to the bars 35 one for each connecting rod 20. The bars 40 are rigidly secured at one of their ends to the transverse member 36 of the rack 31. Control links 41 are pivoted at one of their end portions to the inner ends of the bars 40 and their other end portions are pivoted on the wrist pins 39.

From the above description, it is evident that by lifting the rack 31 until stopped by the engagement of the studs 37 with the upper ends of the slots 38, the control links 39 will position the connecting rods 20, as shown in Fig. 9. In this position of the connecting rods 20, they are simply moved up and down by the cranks 19 and do not move the rocker arms 26 by means of the links 27 and hence the output shaft 12 is stopped.

To drive the output shaft 12, the rack 31 is moved downwardly and the connections to the wrist pin 29 will progressively increase the throw of the connecting rods 20 and hence the speed of the output shaft 12. When the desired speed of the output shaft 12 has been obtained, it is only necessary to stop further downward movement of the rack and the speed of said shaft will remain smooth and constant. As the action of the series of "overrunning" clutches 21 on the output shaft 12 to rotate the same is well known, it is not thought necessary to give a detailed description of the same, except that there is no slippage or lost motion.

From what has been said, it will be understood that the unit described is capable of modifications as to details of construction and arrangement within the scope of the invention herein disclosed and claimed.

What I claim is:

1. In a unit of the class described, end frame members, a driven crank-equipped input shaft, upstanding connecting rods journaled on the crank of said shaft, an output shaft parallel to the input shaft, an overrunning clutch on the output shaft opposite each crank and having a reciprocating outer housing provided with an upstanding rocker arm, links connecting opposite rocker arms and pivoted thereto at their outer end portions, and a rack for controlling the throw of the connecting rods including a yoke-like member, the arms of which are in the form of bell-cranks on the outer side of the end frame members, pivots connecting the arms at their outer end portions to the end frame members, said end frame members having slots on the arcs of circles with their centers at the axes of the pivots, studs on said arms at their elbows extending through the slots, and pivoted links attaching the connecting rods at their pivoted upper ends to the rack.

2. In a unit of the class described, end frame members, a driven crank-equipped input shaft, upstanding connecting rods journaled on the crank of said shaft, an output shaft parallel to the input shaft, an overrunning clutch on the output shaft opposite each crank and having a reciprocating outer housing provided with an upstanding rocker arm, links connecting opposite rocker arms and pivoted thereto at their outer end portions, and a rack for controlling the throw of the connecting rods including a yoke-like member, the arms of which are in the form of bell-cranks on the outer side of the end frame members, pivots connecting the arms at their outer end portions to the end frame members, said end frame members having slots on the arcs of circles with their centers at the axes of the pivots, a pair of bars on the inner sides of the end side members and rigidly secured at one of their end portions to the rack, and studs extending through said slots and connecting the bars at their outer end portions and the arms at their elbows.

3. In a unit of the class described, end frame members, a driven crank-equipped input shaft, upstanding connecting rods journaled on the crank of said shaft, an output shaft parallel to the input shaft, an overrunning clutch on the output shaft opposite each crank and having a reciprocating outer housing provided with an upstanding rocker arm, links connecting opposite rocker arms and pivoted thereto at their outer end portions, and a rack for controlling the throw of the connecting rods including a yoke-like member, the arms of which are in the form of bell-cranks on the outer side of the end frame members, pivots connecting the arms at their outer end portions to the end frame members, said end frame members having slots on the arcs of circles with their centers at the axes of the pivots, a pair of bars on the inner sides of the end frame members and rigidly secured at one of their end portions to the rack, studs extending through said slots and connecting the bars at their outer end portions and the arms at their elbows, and links connecting the studs to the pivots for the arms.

4. In a unit of the class described, end frame members, a driven crank-equipped input shaft, upstanding connecting rods journaled on the crank of said shaft, an output shaft parallel to the input shaft, an overrunning clutch on the output shaft opposite each crank and having a reciprocating outer housing provided with an upstanding rocker arm, links connecting opposite rocker arms and pivoted thereto at their outer end portions, and a rack for controlling the throw of the connecting rods including a yoke-like member, the arms of which are in the form of bell-cranks on the outer side of the end frame members, pivots connecting the arms at their outer end portions to the end frame members, said end frame members having slots on the arcs of circles with their centers at the axes of the pivots, a pair of bars on the inner sides of the end frame members and rigidly secured at one of their end portions to the rack, studs on said arms at their elbows extending through said slots, said rack further including parallel bars and pivoted links attaching the connecting rods at their pivoted upper ends to the bars.

DANIEL F. PRZYBYLSKI.

REFERENCES CITED

The following references are of record in the file of this patent:

UNITED STATES PATENTS

| Number | Name | Date |
|---|---|---|
| 1,617,099 | Bovey et al. | Feb. 8, 1927 |
| 1,883,537 | Burton | Oct. 18, 1932 |

FOREIGN PATENTS

| Number | Country | Date |
|---|---|---|
| 22,401 | Sweden | Oct. 19, 1905 |
| 36,429 | Austria | Aug. 31, 1920 |
| 245,531 | Great Britain | Jan. 14, 1926 |

OTHER REFERENCES

Publication Machine Design, vol. 22, issue 4, page 123, April, 1950.